(12) United States Patent
Heo et al.

(10) Patent No.: US 11,216,328 B2
(45) Date of Patent: Jan. 4, 2022

(54) SERVER, ELECTRONIC DEVICE, AND CONTROL METHOD THEREOF

(71) Applicant: SAMSUNG ELECTRONICS CO., LTD., Suwon-si (KR)

(72) Inventors: Ye-ji Heo, Seoul (KR); Sang-mook Lim, Seoul (KR); Mun-seok Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/754,322

(22) PCT Filed: Oct. 8, 2018

(86) PCT No.: PCT/KR2018/011807
§ 371 (c)(1),
(2) Date: Apr. 7, 2020

(87) PCT Pub. No.: WO2019/093658
PCT Pub. Date: May 16, 2019

(65) Prior Publication Data
US 2020/0334096 A1 Oct. 22, 2020

(30) Foreign Application Priority Data
Nov. 9, 2017 (KR) .......................... 10-2017-0148862

(51) Int. Cl.
*G06F 11/07* (2006.01)
(52) U.S. Cl.
CPC ........ *G06F 11/079* (2013.01); *G06F 11/0751* (2013.01)

(58) Field of Classification Search
CPC ............. G06F 11/3013; G06F 11/3006; G06F 11/3017; G06F 11/3082; G06F 11/3055;
(Continued)

(56) References Cited

U.S. PATENT DOCUMENTS 8,027,051 B2 * 9/2011 Hozumi ............. H04N 1/00973
358/1.15
9,021,609 B2 * 4/2015 Kim ...................... G06F 21/572
726/30
(Continued)

FOREIGN PATENT DOCUMENTS

JP     2978803     11/1999
JP   2007-257085   10/2007
(Continued)

OTHER PUBLICATIONS

Extended European Search Report dated Nov. 3, 2020 in European Patent Application No. 18875347.9.
(Continued)

*Primary Examiner* — Nadeem Iqbal
(74) *Attorney, Agent, or Firm* — Staas & Halsey, LLP

(57) ABSTRACT

An electronic apparatus is provided. The electronic apparatus includes a memory storing a program including a plurality of program codes and performing a predetermined function; a communicator configured to receive policy information including target information and determination information from an external server; and a processor configured to perform the predetermined function using the program and, when a program code corresponding to the target information is executed while performing the predetermined function, compare an execution result of the program code with the determination information and determine whether the program code normally operates.

15 Claims, 9 Drawing Sheets

(58) Field of Classification Search
CPC . G06F 11/0751; G06F 11/079; G06F 11/0736
See application file for complete search history.

(56) References Cited

U.S. PATENT DOCUMENTS

| | | | |
|---|---|---|---|
| 9,558,060 B1 * | 1/2017 | Cessac | ................ G06F 3/04842 |
| 2011/0099273 A1 | 4/2011 | Ide et al. | |
| 2012/0278478 A1 | 11/2012 | Fujino | |
| 2013/0151909 A1 | 6/2013 | Kikuchi | |
| 2013/0232540 A1 | 9/2013 | Said et al. | |

FOREIGN PATENT DOCUMENTS

| | | |
|---|---|---|
| JP | 5585655 | 9/2014 |
| KR | 10-2005-0063023 | 6/2005 |
| KR | 10-2006-0033550 | 4/2006 |
| KR | 10-2010-0114607 | 10/2010 |
| KR | 10-2014-0070203 | 6/2014 |
| KR | 10-1527774 | 6/2015 |
| KR | 10-1561233 | 10/2015 |
| KR | 10-2016-0018474 | 2/2016 |
| KR | 10-1685299 | 12/2016 |
| WO | 2014/158229 | 10/2014 |

OTHER PUBLICATIONS

International Search Report dated Jan. 10, 2019, in corresponding International Patent Application No. PCT/KR2018/011807.
Written Opinion of the International Searching Authority dated Jan. 10, 2019, in corresponding International Patent Application No. PCT/KR2018/011807.

* cited by examiner

SERVER, ELECTRONIC DEVICE, AND CONTROL METHOD THEREOF

CROSS-REFERENCE TO RELATED APPLICATIONS

This application is a U.S. National Stage Application which claims the benefit under 35 U.S.C. § 371 of International Patent Application No. PCT/KR2018/011807 filed on Oct. 8, 2018, which claims foreign priority benefit under 35 U.S.C. § 119 of Korean Patent Application No. 10-2017-0148862 filed on Nov. 9, 2017 in the Korean Intellectual Property Office, the contents of both of which are incorporated herein by reference.

TECHNICAL FIELD

Apparatuses and methods consistent with the present disclosure relate to a server, an electronic apparatus and a control method thereof, and more particularly, to a server and an electronic apparatus capable of automatically detecting errors and malfunctions, and a control method thereof.

BACKGROUND ART

Owing to development of technology, functions of digital devices have become more complex and diverse. Since manufacturers provide open application platforms, many companies are striving to participate in development and provide their own services.

As a result of these changes, unpredictable behaviors occurred at the initial development stage of digital devices and these operations became the cause of problems. When problems were reported at the development stage of a digital device in the prior art, the same problem was reproduced and the problem was solved by using real-time debugging information through a console. However, when the problem was not reproduced or the reproduction method was not accurate, the problem could not be solved.

Also, problems that arise after a product is supplied to a consumer are not easy to reproduce the problem because an external environment is different from the development stage. Even if developers visited a relevant place to identify the problem that occurs, it is impossible to obtain debugging information in real time in a problem that occurs at a specific time. Debugging information that has been obtained took a long time because the developer had to check the information manually. Also, even if the problem is reproduced, it takes a lot of time to reproduce, and a lot of cost for the developer to visit a specific place.

As described above, obtaining the debugging information using the existing method is limited and a lot of cost is required, and a new method of recording the debugging information is needed.

DISCLOSURE

Technical Problem

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a server capable of automatically detecting errors and malfunctions, an electronic apparatus and a control method thereof.

Technical Solution

According to an aspect of the present disclosure, an electronic apparatus includes a memory storing a program including a plurality of program codes and performing a predetermined function; a communicator configured to receive policy information including target information and determination information from an external server; and a processor configured to perform the predetermined function using the program and, when a program code corresponding to the target information is executed while performing the predetermined function, compare an execution result of the program code with the determination information and determine whether the program code normally operates.

The policy information may include a plurality of target information, and the processor may be configured to determine whether each of the plurality of program codes corresponding to the plurality of target information normally operates.

The processor may be configured to compare an execution order of the plurality of program codes corresponding to the plurality of target information with the determination information to determine whether the plurality of program codes normally operates.

The determination information may include at least one of information about a normal result of the program code, normal required time information, and normal parameter information of the program code.

The processor may be configured to control the communicator to transmit determination result information about whether the program code normally operates to the external server.

The processor may be configured to control the communicator to transmit determination result information about whether the normal operation is determined to the external server only when an abnormal operation is determined on the program code.

The policy information may include information about a result notification method, and the processor may be configured to control the communicator to selectively transmit the determination result information both of when the abnormal operation is determined and when the normal operation is determined or transmit the determination result information only when the abnormal operation is determined, based on the information about the result notification method.

According to another aspect of the present disclosure, a server includes a communicator configured to provide policy information for verifying a program including a plurality of program codes and performing a predetermined function to an electronic apparatus and receive determination result information about whether a program code corresponding to the policy information normally operates from the electronic apparatus; and a processor configured to update a pre-stored pattern table based on the received determination result information and modify the policy information based on the updated pattern table, wherein the processor is configured to control the communicator to provide the modified policy information to the electronic apparatus when the policy information is modified.

The processor may be configured to, when a pattern corresponding to the received determination result information does not belong to the pre-stored pattern table, provide information about the pattern to a user, and when weight information for the pattern is received in response to the provision of the information about the pattern, update the pre-stored pattern table using the received weight information and the pattern.

The processor may be configured to generate a list of normal patterns based on a frequency of each of a plurality of patterns constituting the updated pattern table and the weight information, and modify the policy information to include the generated list of normal patterns.

The communicator may be configured to receive apparatus information from each of a plurality of electronic apparatuses, and the processor may be configured to classify the plurality of electronic apparatuses into a plurality of types based on the received apparatus information and provide the same policy information to the plurality of electronic apparatuses of the same type.

The apparatus information may include country information, software model information, and connection device information.

The server may further include a memory storing a table having the plurality of types and information of electronic apparatuses corresponding to the plurality of types, respectively; and an operation input unit configured to receive information about number of samples for each of the plurality of types, and the processor may be configured to, when receiving the apparatus information from the electronic apparatus, determine a type corresponding to the received apparatus information, and selectively add information of the electronic apparatus to the table based on the number of samples in the determined type and the table stored in the memory.

According to another aspect of the present disclosure, a control method of an electronic apparatus includes receiving policy information including target information and determination information from an external server; and performing a predetermined function using a program including a plurality of program codes and performing the predetermined function and, when a program code corresponding to the target information is executed while performing the predetermined function, comparing an execution result of the program code with the determination information and determining whether the program code normally operates.

The policy information may include a plurality of target information, and the determining may include determining whether each of the plurality of program codes corresponding to the plurality of target information normally operates.

The determining may include comparing an execution order of the plurality of program codes corresponding to the plurality of target information with the determination information to determine whether the plurality of program codes normally operates.

The determination information may include at least one of information about a normal result of the program code, normal required time information, and normal parameter information of the program code.

The control method may further include transmitting determination result information about whether the program code normally operates to the external server.

The control method may further include transmitting determination result information about whether the normal operation is determined to the external server only when an abnormal operation is determined on the program code.

The policy information may include information about a result notification method, and the control method may include selectively transmitting the determination result information both of when the abnormal operation is determined and when the normal operation is determined or transmitting the determination result information only when the abnormal operation is determined, based on the information about the result notification method.

BEST MODE

Figure 1:
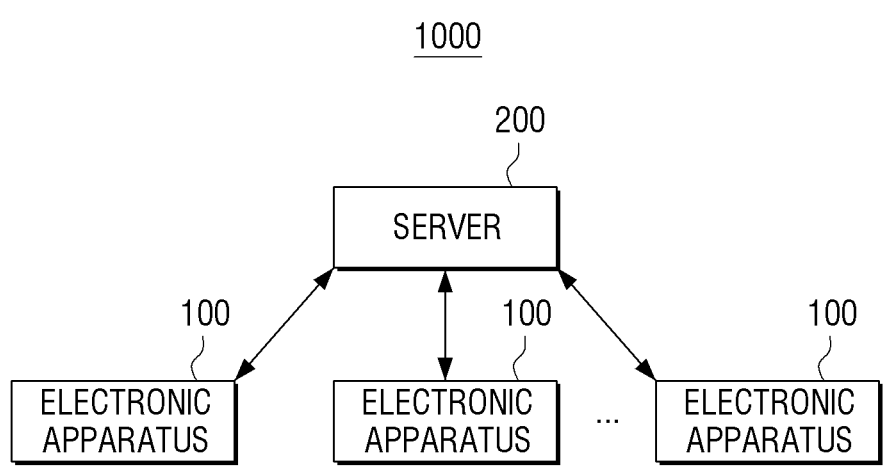
FIG. 1 is a diagram for explaining a management system according to an exemplary embodiment of the present disclosure.

Before describing the present disclosure in detail, a method of describing the present specification and drawings will be described.

Although general terms used in the present specification and claims are selected to describe exemplary embodiments in consideration of the functions thereof, these general terms may vary according to intentions of one of ordinary skill in the art, legal or technical interpretation, the advent of new technologies, and the like. Some terms are arbitrarily selected by the applicant of the exemplary embodiments. These terms may be construed in the meaning defined herein and, unless otherwise specified, may be construed on the basis of the entire contents of this specification and common technical knowledge in the art.

Also, the same reference numerals or signs as used in the accompanying drawings denote parts or components performing substantially the same function. For ease of explanation and understanding, different embodiments will be described using the same reference numerals or signs. In other words, even though all the elements having the same reference numerals are shown in a plurality of drawings, the plurality of drawings do not mean one embodiment.

Also, in the present specification and claims, terms including an ordinal number such as "first", "second", etc. may be used for distinguishing between components. These ordinals are used to distinguish between the same or similar components, and the use of such ordinals should not be construed as limiting the meaning of the term. For example, the components associated with such an ordinal number should not be limited in the order of use, placement order, or the like. If necessary, each ordinal number may be used interchangeably.

As used herein, the singular forms "a", "an" and "the" include plural referents unless the context clearly dictates otherwise. In the present application, the terms "include" or "configured" and the like, specify the presence of a feature, a number, a step, an operation, a component, parts, or a combination thereof but do not preclude the presence or addition of one or more features, numbers, steps, operations, components, parts, or combinations thereof.

In the embodiments of the present disclosure, the terms such as "module," "unit," "part," and the like are terms for designating a component that performs at least one function or operation. The component may be implemented as hardware, software, or a combination of hardware and software. A plurality of "modules", "units", "parts", etc. may be integrated into at least one module or chip and implemented as at least one processor (not shown), excluding the case where each is necessarily implemented as individual specific hardware.

Further, in an embodiment of the present disclosure, when a part is connected to another part, this includes not only a direct connection but also an indirect connection through another medium. Also, the meaning that a part includes an element does not exclude other elements, but may further include other elements, unless specifically stated otherwise.

Hereinafter, various embodiments of the present disclosure will be described in detail with reference to the accompanying drawings.

FIG. 1 illustrates a management system 1000 according to an exemplary embodiment of the present disclosure.

The management system 1000 includes a plurality of electronic apparatuses 100 and a server 200.

The server 200 may collect debugging information from the plurality of electronic apparatuses 100. Debugging is a process of detecting and correcting errors in a computer program. Debugging may be done at the development stage, and even while a consumer is using the electronic apparatus 100.

The server 200 may collect various pieces of information from the plurality of electronic apparatuses 100, generate policy information for obtaining the debugging information based on the collected information, and transmit the policy information to the plurality of electronic apparatuses 100.

In terms of software problem characteristics, problems that occur in one device may occur in all devices with the same characteristics. Accordingly, the server 200 may classify the plurality of electronic apparatuses 100 by type and provide the same policy information to the electronic apparatuses 100 of the same type.

In FIG. 1, only an example in which the server 200 is configured as a single device is shown, but the operations described above may be performed by a plurality of servers upon implementation.

Figure 2:
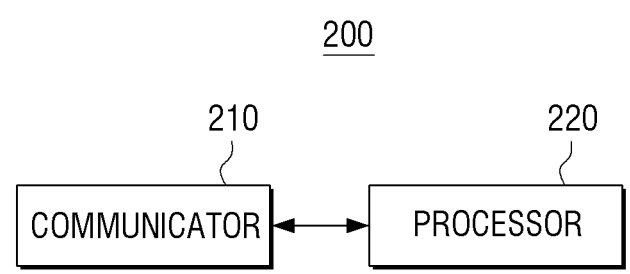
FIG. 2 is a block diagram illustrating a server according to an exemplary embodiment of the present disclosure.

FIG. 2 is a block diagram illustrating the server 200 according to an exemplary embodiment of the present disclosure.

The server 200 includes a communicator 210 and a processor 220.

The communicator 210 is a configuration for performing communication with an external device. The communicator 210 is formed to connect the server 200 with the external device and is connected to a terminal device through a local area network (LAN) and the Internet network, as well as may be connected through a USB (Universal Serial Bus) or a wireless communication port.

The processor 220 is a configuration for controlling the overall operation of the server 200. The processor 220 may be implemented as a CPU, an ASIC, a SoC, a MICOM, or the like.

The processor 220 may receive apparatus information from each of the plurality of electronic apparatuses 100 through the communicator 210, classify the plurality of electronic apparatuses 100 into a plurality of types based on the received apparatus information, and provide the same policy information to the plurality of electronic apparatuses 100 of the same type.

The apparatus information received from each of the plurality of electronic apparatuses 100 may include information about factors that affect an operation of software. For example, the apparatus information may include at least one of country information, software model information, and connection apparatus information. When the plurality of electronic apparatuses 100 are a TV, factors affecting the operation of the software may include, for example, country, terrestrial connectivity, satellite connectivity, set-top box connectivity, sound bar connectivity, etc.

Table 1 below shows an example of a plurality of types classified according to the apparatus information. Whether the electronic device 100 is connected to a particular device may be expressed as 0 and 1.

TABLE 1

| type | country | S/W model | terrestrial | satellite | set-top box | sound bar | ... |
|------|---------|-----------|-------------|-----------|-------------|-----------|-----|
| A | KOR | UKS9000 | 0 | 0 | 0 | 1 | ... |
| B | KOR | UKS9000 | 0 | 0 | 1 | 0 | ... |
| C | KOR | UKS9000 | 0 | 1 | 0 | 0 | ... |
| ... | ... | ... | ... | ... | ... | ... | ... |

The number of samples (the number of apparatuses to be monitored) may be set for each of a plurality of types. The server 200 may further include an operation input unit capable of receiving an input from a user, and may receive information about a plurality of types of samples numbers through the operation input unit. The operation input unit may be implemented as, for example, a keyboard, a mouse, a touch pad, a button, or the like. Alternatively, the server 200 may not have the operation input unit, and may receive a user input from an external apparatus through the communicator 210.

Since the number of samples is specified for each type and the debugging information is collected only from a predetermined number of apparatuses, memory may be more efficiently managed than the debugging information is acquired from all devices.

The server 200 may include a memory. The memory may store a table having a plurality of types and information about monitoring target devices corresponding to the plurality of types. The memory may be implemented as a non-volatile memory, a volatile memory, a flash memory, a hard disk drive (HDD), a solid state drive (SSD), or etc. Meanwhile, the memory may be implemented not only as a storage medium in the server 200, but also as an external storage medium, such as a micro SD card, a USB memory, or a Web server over a network.

Table 2 below shows an example of a table including information about the number of samples for each type and monitoring target devices (targets).

TABLE 2

| type | Number of samples | target 1 HWDUID | target 2 | target 3 | ... |
|---|---|---|---|---|---|
| A | 900 | SAM12SUNG3 | ... | ... | ... |
| B | 1000 | ... | ... | ... | ... |
| C | 990 | ... | ... | ... | ... |
| ... | ... | ... | ... | ... | ... |

The processor 220 may determine whether a generated type exists in a table pre-stored in the memory based on the apparatus information received from the electronic apparatus 100, and add a new type to the table when the type does not exist.

For example, the processor 220 may determine whether the generated type exists in the table pre-stored in the memory based on the apparatus information received from the electronic apparatus 100, and when the type exists, compare the number of samples of a corresponding type and the number of monitoring target devices, when the number of monitoring target devices is smaller than the number of samples, add information about a corresponding electronic apparatus to the table, and, when the number of monitoring target devices is larger than the number of samples, may not add the information about the corresponding electronic apparatus to the table.

The processor 220 may provide the same policy information for electronic apparatuses that are classified as the same type. Therefore, management may be efficiently performed only on devices of a predetermined number of samples, and thus server traffic management and memory may be effectively reduced, thereby achieving cost reduction. Also, since factors that may affect software operation are classified and managed according to types, when a problem occurs, it is possible to determine what factors affected the problem.

Figure 3:
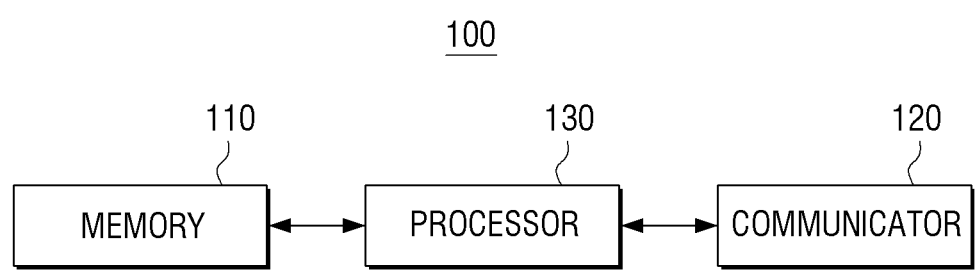
FIG. 3 is a block diagram for explaining a configuration of an electronic apparatus according to an exemplary embodiment of the present disclosure.

FIG. 3 is a block diagram for explaining a configuration of the electronic apparatus 100 according to an exemplary embodiment of the present disclosure.

Referring to FIG. 3, the electronic apparatus 100 includes a memory 110, a communicator 120, and a processor 130.

The electronic apparatus 100 may be implemented in various types of apparatuses. For example, the electronic apparatus 100 may be a computer, a TV, a cellular phone, a smart phone, a tablet PC, a smart watch, a smart band, a PDA, or the like.

The memory 110 stores various data and programs necessary for driving the electronic apparatus 100. The memory 110 may be implemented as a non-volatile memory, a volatile memory, a flash memory, a hard disk drive (HDD), a solid state drive (SSD), or etc. The memory 110 may be implemented not only as a storage medium in the electronic apparatus 100 but also as an external storage medium such as a micro SD card, a USB memory, or a Web server over a network.

The memory 110 may store a program configured by a plurality of program codes and performing a predetermined function. For example, when the electronic apparatus 100 is a TV, a program for performing a channel switching function is stored in the memory 110 and may include a plurality of program codes. For example, the program may include the plurality of program codes such as "Set_Tune ( ) Check_TunerLock ( )", "Check DecoderLock ( )", and the like.

The communicator 120 is a configuration for performing communication with an external apparatus. The communicator 120 is formed for connecting the electronic apparatus 100 to the external apparatus and may be connected to a terminal apparatus through a local area network (LAN) and the Internet network, as well as may be connected through a USB (Universal Serial Bus) port or a wireless communication port.

For example, the communicator 120 may perform communication using at least one of communication methods such as infrared communication (IrDA), radio frequency identification (RFID), near field communication (NFC), wireless fidelity (WiFi), ultra wideband (UWB), WirelessDisplay (WiDi), WirelessHD (WiHD), Wireless Home Digital Interface (WHDI), Miracast, Wireless Gigabit Alliance (Wigig), Wi-Fi Direct, Bluetooth (ex. Bluetooth Classic), Bluetooth low energy, AirPlay, Z-wave, 4LoWPAN, LTE D2D, GPRS, Weightless, Edge Zigbee, Digital Living Network Alliance (DLNA), ANT+, Digital Enhanced Cordless Telecommunications (DECT), Wireless Local Area Network (WLAN), Communication methods such as Global System for Mobile communications (GSM), Universal Mobile Telecommunication System (UMTS), Long-Term Evolution (LTE), and Wireless Broadband (WiBRO), etc.

The processor 130 is a configuration for controlling the overall operation of the electronic apparatus 100. The processor 130 may be implemented as a CPU, an ASIC, a SoC, a MICOM, or the like.

The processor 130 may transmit apparatus information to the server 200 through the communicator 120. The apparatus information may include factors that may affect an operation of software, such as country information, software model information, connection device information (information on a device connected to the electronic apparatuses 100), etc., as described above.

The processor 130 may transmit the apparatus information to the server 200 at regular intervals or only when a specific event occurs to reduce an amount of transmission. For example, the processor 130 may transmit the apparatus information to the server 200 through the communicator 120 when an event occurs in which the electronic apparatus 100 is powered on. The processor 130 may determine a type of the electronic apparatus 100 based on the apparatus information. The processor 130 may compare the apparatus information before the electronic apparatus 100 is turned off and after the electronic apparatus 100 is turned on and transmit the apparatus information to the server 200 only when the type is changed. For example, before the electronic apparatus 100 is turned off, when the electronic apparatus 100 is connected to a set-top box, whereas when the electronic apparatus 100 is turned on, when the electronic apparatus 100 is not connected to the set-top box, the electronic apparatus 100 may determine that type is changed and transmit the apparatus information to the server 200. Alternatively, the electronic apparatus 100 may transmit information about the determined type itself to the server 200 instead of the apparatus information.

The server 200 may determine the type of the electronic apparatus 100 based on the information about the apparatus information or the type received from the electronic apparatus 100 and provide policy information corresponding to the determined type to the electronic apparatus 100.

An example of a process of exchanging information between the electronic apparatus 100 and the server 200 will be described with reference to FIG. 4.

Figure 4:
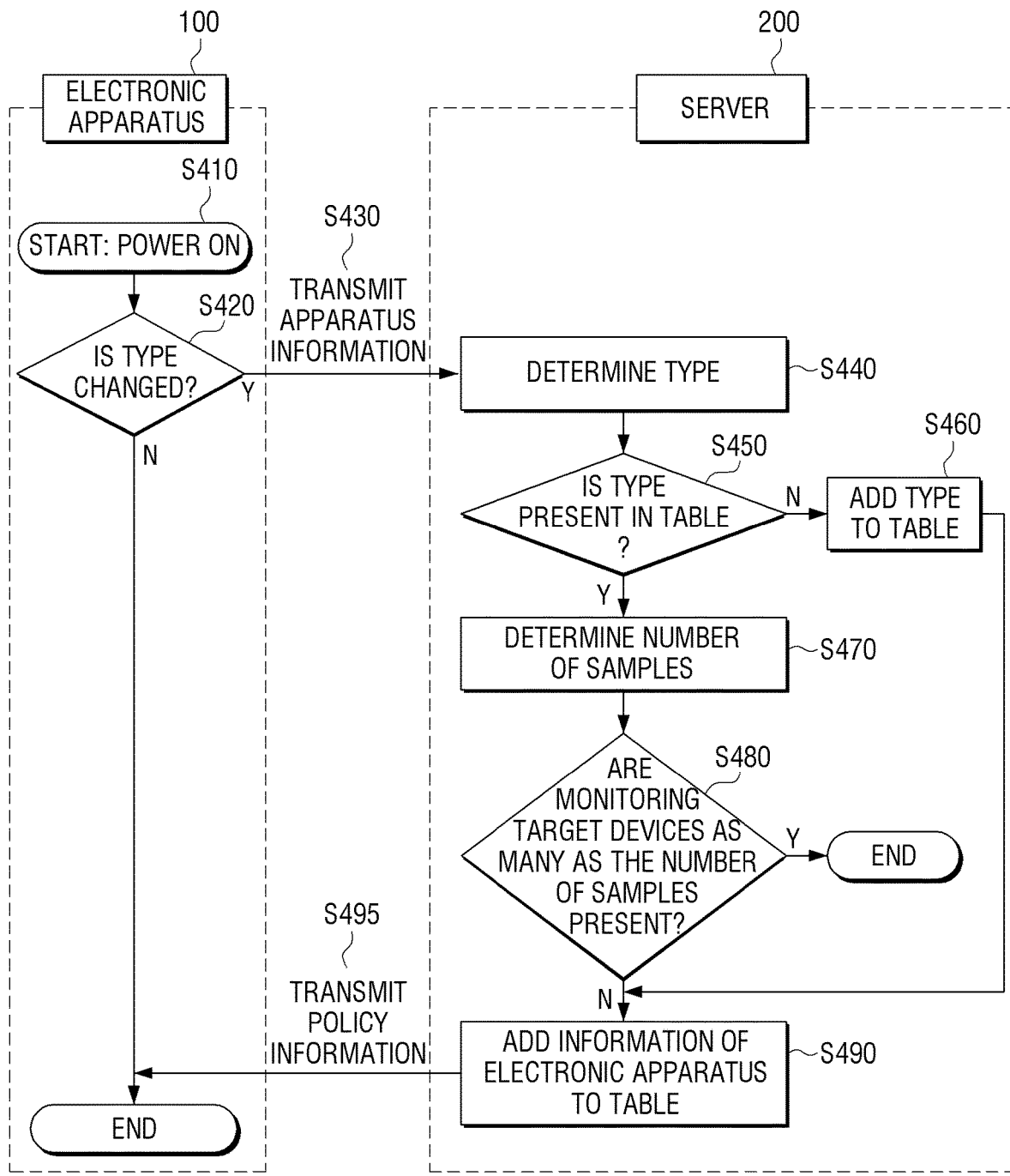
FIG. 4 is a flowchart of a policy information providing method according to an exemplary embodiment of the present disclosure.

Referring to FIG. 4, when the electronic apparatus 100 is turned on (S410), the processor 130 may determine whether a type is changed in comparison with before the electronic apparatus 100 is turned off based on apparatus information (S420), when it is determined that the type is changed (S420: YES), transmit the apparatus information to the server 200. The server 200 may determine the type of the electronic apparatus 100 based on the received apparatus information (S440). When it is determined whether the determined type is present in a pre-stored table and it is determined that the determined type is not present (S450: NO), the determined type may be added to the table as a new type (S460). Information of the electronic apparatus 100 is added to the table to which the new type is added (S490). The server 200 may transmit policy information to the electronic apparatus 100 (S495).

Meanwhile, when the determined type exists in the pre-stored table (S450; YES), the server 200 may determine a predetermined number of samples with respect to the corresponding type (S470). When it is determined whether monitoring target devices as many as the number of samples are present and it is determined that the monitoring target devices as many as the number of samples are not present (S480: NO), the information of the electronic apparatus 100 is added to the table (S490). The server 200 may transmit the policy information to the electronic apparatus 100 (S495).

The processor 130 may determine whether the execution of a program code is a normal operation based on the policy information received from the server 200 through the communicator 120 and transmit determination result information about whether the normal operation to the server 200 through the communicator 120.

The policy information is information for verification of a program including a plurality of program codes and performing a predetermined function and may include target information and determination information. The target information is information indicating a program code to be monitored. The determination information is information for determining whether the execution result of the program code to be monitored results from the normal operation.

The target information may include information such as a name of a source file including the program code to be monitored, a location (or a line) of the program code to be monitored in the source file, items (e.g., a return value, a parameter, required time, etc.) to be determined when the program code to be monitored is executed, and the like.

The determination information may include information about a normal result of the items to be determined when the program code to be monitored is executed. For example, when the item to be determined when the program code to be monitored is executed is at least one of the return value, a parameter value, and the required time, the determination information may include information about the at least one of a normal return value, a normal parameter value, and normal required time.

According to another exemplary embodiment, when there are a plurality of items to be determined when the program code to be monitored is executed, the determination information may include a normal combination value corresponding to normal result values with respect to the plurality of items. For example, when the normal return value is 1, the normal parameter value is 0, and the normal required time is 1 ms or less, 1 may be calculated as the normal combination value corresponding to a combination of these based on a predetermined reference. According to the present embodiment, instead of including all of a plurality of normal result values on the plurality of items to be determined when the program code to be monitored is executed, one normal combination value corresponding to the combination of these is included, and thus it is advantageous that an amount of data transferred from the server 200 to the electronic apparatus 100 may be reduced.

The policy information may include one or a plurality of pieces of target information. When the policy information includes the plurality of pieces of target information, the determination information may include not only the normal result value or the normal combination value with respect to the items to be determined when the program code to be monitored is executed but also information about a normal execution order of the plurality of program codes to be monitored. The information about the normal execution order may include information indicating what program code is first executed among the plurality of program codes to be monitored upon the normal operation and information about the normal execution order of the other program codes after the program code to be first executed. The determination information may include a normal result pattern that groups the normal combination values with respect to the plurality of program codes and a normal order pattern that represents a normal order of the plurality of program codes.

The processor 130 may perform a predetermined function using the program stored in the memory 110. When the program code corresponding to the target information included in the policy information is executed during performing the predetermined function, the processor 130 may compare a result of executing the program code and the determination information included in the policy information to determine whether the program code normally operates.

When there are a plurality of items to be determined when the program code corresponding to the target information is executed, the determination information may include a plurality of normal result values with respect to the plurality of items. In this case, the processor 130 may compare a plurality of result values with respect to the plurality of items when the program code corresponding to the target information is executed and the plurality of normal result values included in the determination information to determine whether the executed program code normally operates.

For example, when the items to be determined when the program code corresponding to the target information is executed are a return value, a parameter value, and required time, the determination information may include normal result values with respect to the return value, the parameter value, and the required time. The processor 130 may compare the return value, the parameter value, the required time according to the execution of the program code corresponding to the target information and the normal return value, the normal parameter value, and the normal required time included in the determination information respectively to determine whether the executed program code normally operates.

When there are the plurality of items to be determined when the program code corresponding to the target information is executed, the determination information may include a normal combination value corresponding to a combination of the plurality of normal result values with respect to the plurality of items. In this case, the processor 130 may calculate a combination value corresponding to a combination of the plurality of result values with respect to the plurality of items when the program code corresponding to the target information is executed and compare the calculated combination value and the normal combination value included in the determination information to determine whether the executed program code normally operates. A reference for the processor 130 to calculate the combination value is the same as the reference for the server 200 to calculate the normal combination value. Information about the reference may be pre-stored in the memory 110 or may be included in the policy information and provided to the electronic apparatus 100.

For example, when the items to be determined when the program code corresponding to the target information is executed are the return value, the parameter value, and the required time, and when the determination information includes the return value, the parameter value, and the required time, the server 200 may calculate the normal combination value corresponding to a combination of the normal result values with respect to each of them according to a predetermined reference, the processor 130 may calculate a combination value corresponding to a combination of the return value, the parameter value, and the required time according to the execution of the program code corresponding to the target information according to the same reference of the predetermined reference and compare the calculated combination value with the normal combination value included in the determination information to determine whether the executed program code normally operates.

When the policy information includes a plurality of target information, the processor 130 may determine whether each of the plurality of program codes corresponding to the plurality of target information normally operates. The processor 130 may determine whether each of the plurality of program codes normally operates based on the normal result value or the normal result value included in the determination information with respect to each of the plurality of program codes as described above.

When the policy information includes the plurality of target information, the determination information may include not only the normal result value or the normal combination value but also information about a normal order. In this case, the processor 130 may compare an execution order of the program codes corresponding to the plurality of target information and the determination information to determine whether the plurality of program codes normally operate.

The information about the normal execution order may include information indicating what program code is first executed among the plurality of program codes corresponding to the plurality of target information during the normal operation and information about a normal execution order of the other program codes after the program code to be first executed. Based on the information about the normal execution order, the processor 130 may determine whether a plurality of programs corresponding to the plurality of target information are executed in the normal order. The information indicating what program code is first executed corresponding to the plurality of target information during the normal operation is referred to as trigger information and the program code is first executed during the normal operation is referred to as a trigger.

When the execution of the trigger is detected based on the trigger information, the processor 130 may determine an order of the program codes corresponding to the target information executed until the trigger is detected again after the detection of the trigger and determine whether the determined order is a normal order based on the information about the normal execution order included in the determination information.

An exemplary embodiment in which the normal operation is determined will be described with reference to FIG. 5 below.

Figure 5:
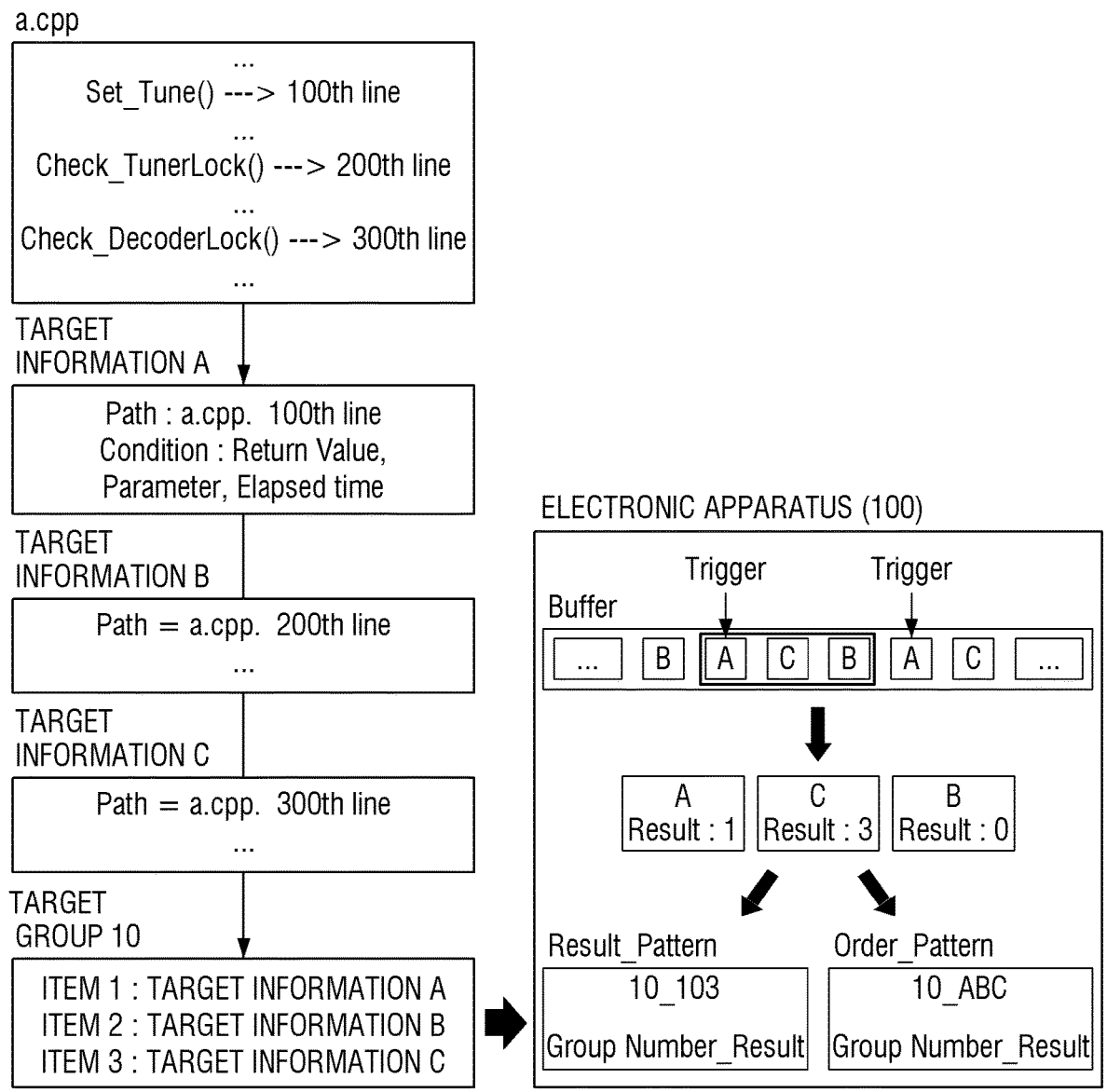
FIG. 5 is a diagram for explaining an error automatic detection method according to an exemplary embodiment of the present disclosure.

Referring to FIG. 5, a source file with a file title a .cpp corresponds to a program that performs a channel switching function. Policy information may include target information A, target information B, and target information C as a plurality of target information. The target information A corresponds to a program code of "Set_Tune ( )". The target information B corresponds to a program code of "Check_TunerLock ( )". The target information C corresponds to a program code of "Check_DecoderLock ( )". More specifically, the target information A includes information indicating that a name of a source file including a program code to be monitored is a. cpp, a position of the program code to be monitored in the corresponding source file is a 100th line, and an item (or condition) to be determined when the program code to be monitored is executed is a return value, a parameter, and required time. Like the target information A, the target information B and the target information C include information indicating that names of source files including program codes to be monitored, positions (or lines) of the program codes to be monitored in the source files, and items to be determined when the program codes to be monitored are executed.

The target information A to C may constitute one target group and is named as a target group 10. The policy information includes the target information A to C and determination information. In the present example, the determination information includes a normal result pattern including 1 as a normal combination value corresponding to the target information A, 0 as a normal combination value corresponding to the target information B, and 3 as a normal combination value corresponding to the target information C, and a normal order pattern including information about the normal execution order including information indicating that a program code corresponding to the target information A is the trigger, and information indicating that an order of "the program code corresponding to the target information A→the program code corresponding to the target information B→the program code corresponding to the target information C" is the normal execution order.

The normal result pattern may be expressed in the form of "10_103" (target group number_normal combination value). The normal order pattern may be expressed in the form of "10_ABC" (target group number_normal order).

The server 200 provides the policy information to the electronic apparatus 100. The processor 130 writes information about a program code corresponding to the target information included in the policy information on a buffer when the program code is executed.

When execution of the program code A corresponding to the target information A that is the trigger is detected, the processor 130 determines an order of the program codes C and B corresponding to the target information executed until the execution of the program code A is detected again after the execution of the program code A is detected.

Then, the processor 130 calculates a combination value corresponding to a combination of a return value, a parameter, and required time according to the execution of the program code A. In the present example, the combination value is 1. Similarly, the processor 130 calculates a combination value corresponding to a combination of a return value, a parameter, and required time according to the execution of the program code C. In the present example, the combination value is 3. Similarly, the processor 130 calculates a combination value corresponding to a combination of a return value, a parameter, and required time according to the execution of the program code B. In the present example, the combination value is 0.

The processor 130 may generate an order pattern based on the order of the executed program codes. The order pattern may be generated, for example, "10_ACB" to represent a target group number ('10' in the example of FIG. 5) and the order of the executed program codes. The processor 130 may then generate a result pattern based on the calculated combination values. The result pattern is generated to represent a target group number and a combination value calculated with respect to each of the executed program codes. The combination value may be listed corresponding to an order of the program code A, the program code B, and the program code C that is the normal execution order. Thus, the combination value is generated as "10_103".

The processor 130 may determine whether the generated order pattern and result pattern are included in the determination information to determine whether the program codes A, B, and C normally operate. When at least one of the order pattern and the result pattern is not included in the determination information, the processor 130 may determine that the program codes A, B, and C abnormally operate.

The processor 130 may transmit determination result information about whether the normal operation is determined to the server 200 through the communicator 120 based on a result of determination whether the normal operation is determined.

According to an exemplary embodiment, the processor 130 may transmit the determination result information about whether the normal operation is determined to the server 200 through the communicator 120 only when the abnormal operation is determined, except when the normal operation is determined.

According to another exemplary embodiment, the electronic apparatus 100 may operate in a first mode in which the determination result information about whether the normal operation is determined is transmitted to the server 200 only when the abnormal operation is determined or a second mode in which the determination result information is transmitted when the abnormal operation is determined and when the normal operation is determined. The second mode is a mode that may be used when a sufficient debugging database is not secured in the server 200. The second mode is a mode in which even when a normal pattern included in the determination information is detected to obtain a probability distribution diagram with respect to the number of cases in the pattern, the determination result is transmitted to the server 200 to obtain the probability distribution diagram with respect to the number of cases in the pattern. The second mode is a mode that may be used, for example, at a development stage. The first mode may be referred to as "Only Detection mode". The second mode may be referred to as "Detection & Learning mode".

Any one of the first mode and the second mode may be selected by a manipulation of a user of the electronic apparatus 100. Alternatively, the server 200 may control the electronic apparatus 100 to operate in the first mode or the second mode. For example, the server 200 may transmit information about a result notification method to the electronic apparatus 100 by including the information in the policy information. The information about the result notification method is information indicating which mode the electronic apparatus 100 should operate in the first mode or the second mode. The processor 130 may operate in the first mode in which only an abnormal result is transmitted when the information about the result notification method included in the policy information received from the server 200 indicates the first mode, and may operate in the second mode in which all of the determination results are transmitted when the information indicates the second mode.

The determination result information about whether the normal operation is determined transmitted by the electronic apparatus 100 to the server 200 may include at least one of an order pattern and a result pattern that may be generated as in the above-described example.

The processor 130 may transmit only information about a pattern corresponding to the abnormality in the order pattern and the result pattern to the server 200 or may also transmit a pattern corresponding to the normal that may be considered with the pattern corresponding to the abnormality to the server 200.

Hereinafter, an operation of the server 200 that receives the determination result information about determination will be described.

The server 200 may update the policy information based on the determination result information about whether the normal operation is determined received from the electronic apparatus 100 and provide the updated policy information to the electronic apparatus 100.

The server 200 may update a pre-stored pattern table based on the determination result information about whether the normal operation is determined received from the electronic apparatus 100 and modify the policy information based on the updated pattern table. The pattern table may include a pattern of a plurality of program codes, that is, an order pattern and a result pattern, and may include information about weights differently set with respect to a pattern corresponding to the abnormal operation and a pattern corresponding to the normal operation.

The processor 220 of the server 200 may provide information about the pattern to the user (a person in charge of debugging) when a pattern corresponding to the determination result information received from the electronic apparatus 100 is not in the pre-stored pattern table, and, when weight information about the pattern is input from the user in response to the provision of the information about the pattern, update the pre-stored pattern table using the input weight information and the pattern.

For example, the processor 220 may provide the information about the pattern to a terminal (a computer, a mobile phone, etc.) of the user through the communicator 210, and when the user determines whether the patterns corresponds to the abnormal operation or the normal operation and inputs a weight to the terminal, the server 200 may receive information about the input weight through the communicator 210. For example, a positive weight may be set for the pattern corresponding to the normal operation, and a negative weight may be set for the pattern corresponding to the abnormal operation.

The processor 220 may modify the policy information to include a plurality of patterns constituting the updated pattern table and determination information corresponding to the weight information about each of the plurality of patterns.

When the policy information is modified, the processor 220 may control the communicator 210 to provide the modified policy information to the electronic apparatus 100.

A process of modifying and providing the policy information will be described in more detail with reference to FIG. 6.

Figure 6:
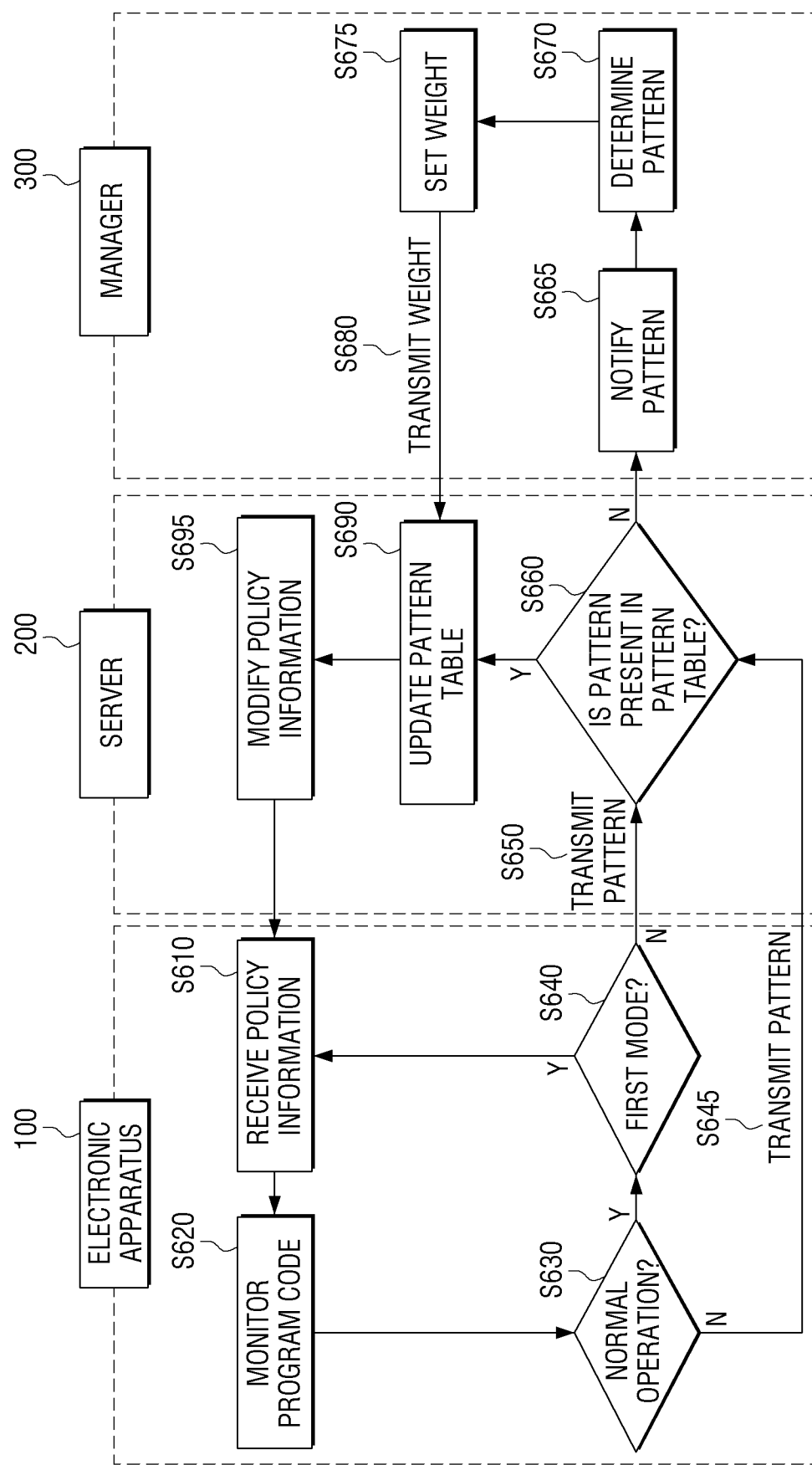
FIG. 6 is a diagram for explaining a policy information updating method according to an exemplary embodiment of the present disclosure.

FIG. 6 is a flowchart illustrating a process of modifying and providing policy information according to an exemplary embodiment of the present disclosure.

Referring to FIG. 6, the electronic apparatus 100 receives the policy information from the server 200 (S610). The electronic apparatus 100 monitors whether a program code corresponding to target information is executed based on the target information included in the received policy information (S620). When it is detected that the program codes corresponding to the target information are executed during monitoring, the electronic apparatus 100 determines whether an execution order of the program codes is a normal execution order or a result value according to the execution of the program codes is normal based on determination information included in the policy information (S630). The electronic apparatus 100 may determine whether it is a normal operation by comparing a normal pattern included in the determination information with a pattern generated according to the execution of the program code. A pattern may have an order pattern and a result pattern. When determining that it is not the normal operation, the electronic apparatus 100 transmits information about an abnormal pattern to the server 200 (S645). When determining that it is the normal operation as a result of determination, the electronic apparatus 100 determines whether a result notification method is a first mode or a second mode (S640). The first mode is a mode in which a determination result is transmitted to the server 200 only when the abnormal operation is determined. The second mode is a mode in which the determination result is transmitted to the server 200 both of when the abnormal operation is determined and the normal operation is determined. When it is determined that the result notification method is the second mode, the electronic apparatus 100 transmits the pattern (S650).

When the pattern is received, the server 200 determines whether the received pattern exists in a pre-stored pattern table (S660). When it is determined that the pattern is a new pattern that does not exist in the pattern table, the server 200 may notify a manager 300 about the pattern to see that the pattern corresponds to the normal operation (S665). The manager 300 may be a developer of a program to be monitored. As a method of notifying the manager 300 about the pattern, information about the pattern may be transmitted to a terminal apparatus of the manager 300 pre-registered in the server 200 through the communicator 210.

The manager 300 may determine whether the notified pattern is a normal pattern (S670). When the notified pattern is determined to be abnormal or when the notified pattern is determined to be normal, the manager 300 may set weights differently (S675). For example, a negative value (for example, '−1') may be set for the pattern when it is determined to be abnormal, and a positive value (for example, '1') may be set for the pattern when it is determined to be normal. Then, information about the set weights is transmitted to the server 200 (S680).

The server 200 may update the pattern table (S690). For example, when the pattern transmitted in steps S645 and S650 exists in the pattern table, the server 200 may update the pattern table by increasing a frequency of the pattern. Also, the server 200 may update the pattern table based on the weight provided from the manager 300.

The server 200 may modify the policy information based on the updated pattern table (S695). For example, the server 200 may generate a list of normal patterns based on the frequency and the weight of each of a plurality of patterns constituting the updated pattern table. The list of normal patterns may also be called a white list. Specifically, the server 200 may derive a list of normal patterns based on a determination reference that the probability of a normal operation is higher as the frequency is higher. The server 200 may include the pattern to which the positive value is set in the normal pattern list irrespective of the frequency. The pattern to which the negative weight is set may not be included in the normal pattern list regardless of the frequency. Meanwhile, since the manager 300 may not set a weight for every pattern, a default weight value of 0 may be automatically set for patterns for which the manager 300 does not set a weight. Among the patterns for which the weight of 0 is set, patterns having frequency equal to or greater than a predetermined frequency may be included in the normal pattern list. The server 200 may modify the policy information based on the normal pattern list generated above. The normal pattern list may be included in the determination information of the policy information. Then, the server 200 may transmit the modified policy information to the electronic apparatus 100, and the electronic apparatus 100 may receive the modified policy information (S610).

Figure 7:
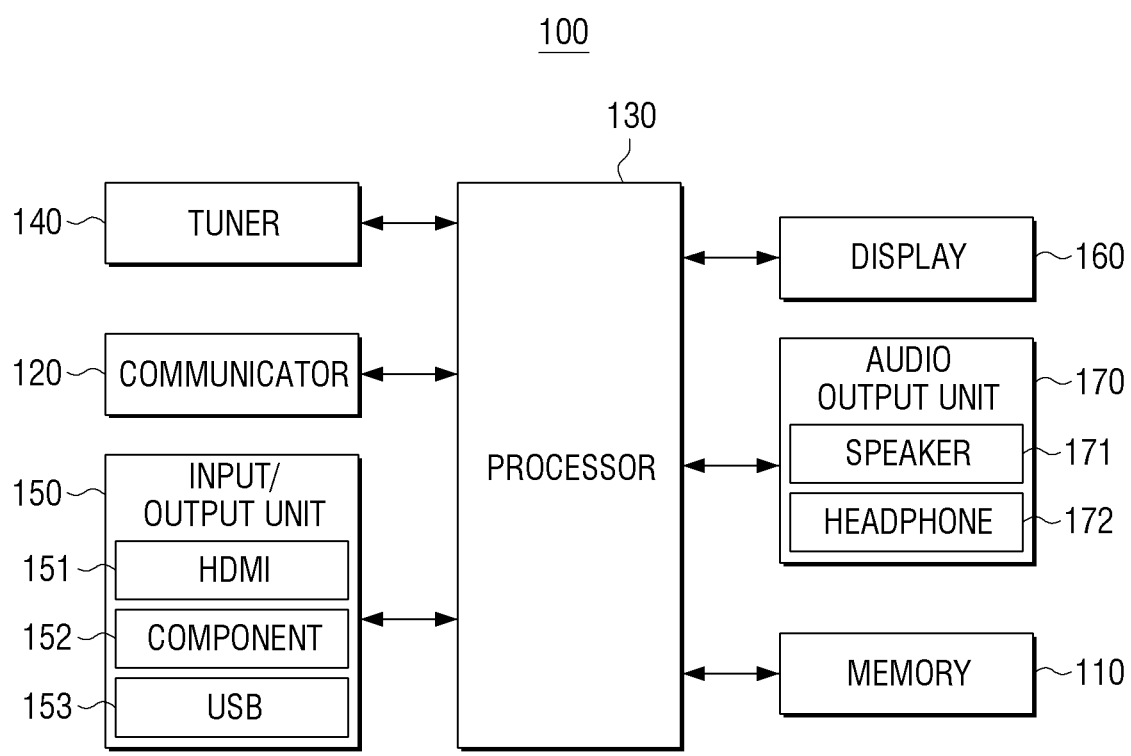
FIG. 7 is a block diagram for explaining a configuration of an electronic apparatus according to another exemplary embodiment of the present disclosure.

FIG. 7 is a diagram for explaining an example of a case where the electronic apparatus 100 is implemented as a TV.

Referring to FIG. 7, the electronic apparatus 100 may be implemented as, for example, an analog TV, a digital TV, a 3D-TV, a smart TV, an LED TV, an OLED TV, a plasma TV, a monitor, a curved TV having a screen with fixed curvature, a flexible TV having the screen with fixed curvature, a bended TV having the screen with fixed curvature, and/or a curvature-variable TV capable of changing curvature of a current screen according to a received user input but is not limited thereto.

The electronic apparatus 100 may include the memory 110, the communicator 120, the processor 130, a tuner 140, an input/output unit 150, a display 160 and an audio output unit 170.

The memory 110, the communicator 120 and the processor 130 described in FIG. 7 may perform the same functions as the memory 110, the communicator 120, and the processor 130 described with reference to FIG. 3.

The tuner 140 may tune and select only a frequency of a channel to be received by an external apparatus among many radio wave components through amplification, mixing, resonance, etc. of a broadcast signal received by wired or wirelessly. The broadcast signal may include video, audio, and additional data (e.g., an EPG (Electronic Program Guide).

The tuner 140 may receive broadcast signals from various sources such as terrestrial broadcast, cable broadcast, or satellite broadcast.

The tuner 140 may be implemented in an all-in-one with the electronic apparatus 100 or a separate apparatus (e.g., a set-top box or a tuner connected to the input/output unit 150) having a tuner unit electrically connected to the electronic apparatus 100.

The communicator 120 is formed for connecting the electronic apparatus 100 to an external apparatus and may be connected to a terminal apparatus through a local area network (LAN) and the Internet network, as well as a USB (Universal Serial Bus) port or a wireless communication port. For example, the communicator 120 may perform communication using at least one of communication methods such as infrared communication (IrDA), radio frequency identification (RFID), near field communication (NFC), wireless fidelity (WiFi), ultra wideband (UWB), wireless display (WiDi), WirelessHD (WiHD), Wireless Home Digital Interface (WHDI), Miracast, Wigig (Wireless Gigabit Alliance), Wi-Fi Direct, Bluetooth (ex. Bluetooth Classic), Bluetooth Low Energy, AirPlay, Z-wave, 4LoWPAN, LTE D2D, GPRS, Weightless, Edge Zigbee, Digital Living Network Alliance (DLNA), ANT+, Digital Enhanced Cordless Telecommunications (DECT), Wireless Local Area Network (WLAN), Global System for Mobile communications (GSM), Universal Mobile Telecommunication System (UMTS), Long-Term Evolution (LTE), and Wireless Broadband (WiBRO).

The input/output unit 150 is a configuration to be connected to other apparatuses. The input/output unit 150 may include at least one of a high-definition multimedia interface (HDMI) port 151, a component input jack 152, and a USB port 153. The input/output unit 150 may further include at least one of ports such as RGB, DVI, HDMI, DP, Thunderbolt, and the like.

The display 160 is a configuration for displaying an image and may be implemented as a liquid crystal display (LCD), and in some cases, a cathode ray tube (CRT), a plasma display panel (PDP), an organic light emitting diode (OLED), or a liquid crystal display diode, and TOLED (transparent OLED). Also, the display 160 may be implemented as a touch screen capable of sensing a touch manipulation of a user.

Various screens may be provided through the display 160. For example, a UI screen for receiving a selection of any one of a first mode in which only a determination result of an abnormal operation is transmitted to the server 200 and a second mode in which determination results of both abnormal and normal operations are transmitted to the server 200 may be provided through the display 160.

The audio output unit 170 is a configuration for outputting audio, for example, audio included in the broadcast signal received through the tuner 140, audio input through the communicator 120, the input/output unit 150, or audio included in an audio file stored in the memory 110. The audio output unit 170 may include a speaker 171 and a headphone output terminal 172.

The memory 110 may store various data, programs, or applications for driving and controlling the electronic apparatus 100 under the control of the processor 130. For example, the memory 110 may store the policy information provided from the server 200. The policy information may be updated by receiving update information from the server 200. Update may be performed by adding at least one of new target information and new determination information to the existing policy information or replacing the policy information.

The processor 130 controls the overall operation of the electronic apparatus 100 and the signal flow between the internal components of the electronic apparatus 100 and performs a function of processing data. The processor 130 may be implemented as a CPU, an ASIC, a SoC, a MICOM, or the like.

The processor 130 accesses the memory 110 and performs booting using an O/S stored in the memory 110. The processor 130 may perform various functions using various programs, contents, data, and the like stored in the memory 110.

Figure 8:
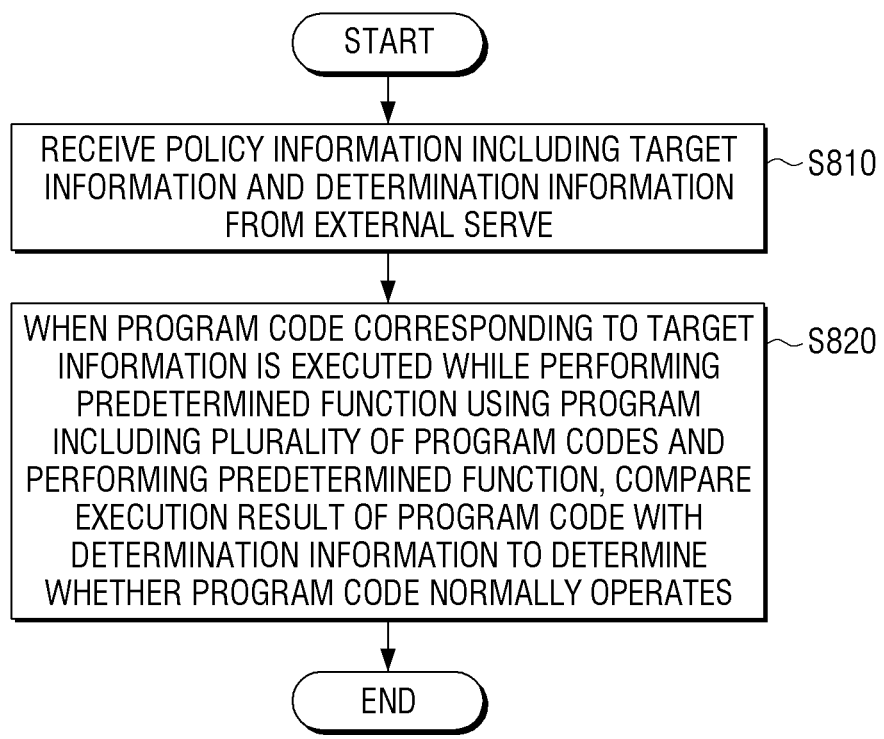
FIG. 8 is a flowchart for explaining a control method of an electronic apparatus according to an exemplary embodiment of the present disclosure.

FIG. 8 is a flowchart for explaining a control method of an electronic apparatus according to an exemplary embodiment of the present disclosure. The flowchart shown in FIG. 8 may be configured with operations that are processed in the electronic apparatus 100 described herein. Therefore, even if omitted below, the contents described with respect to the electronic apparatus 100 may also be applied to the flowchart shown in FIG. 8.

Referring to FIG. 8, the electronic apparatus receives policy information including target information and determination information from an external server (S810).

The electronic apparatus performs a predetermined function using a program including a plurality of program codes and performing the predetermined function, and, when a program code corresponding to the target information is executed while performing the predetermined function, compare an execution result of the program code with the determination information to determine whether the program code normally operates (S820).

The policy information may include a plurality of target information. In this case, in step S820, the electronic apparatus may determine whether each of the plurality of program codes corresponding to the plurality of target information normally operates.

In this case, the electronic apparatus may compare an execution order of the plurality of program codes corresponding to the plurality of target information with the determination information to determine whether each of the plurality of program codes normally operates.

The electronic apparatus may transmit determination result information about whether the program code normally operates to the external server. In this case, only when it is determined that the program code abnormally operates, the electronic apparatus may transmit the determination result information about whether the program code normally operates to the server. Alternatively, based on information about a result notification method included in the policy information, the electronic apparatus may selectively operate in a mode in which the determination result information is transmitted both of when the abnormal operation is determined and when the normal operation is determined or in a mode in which the determination result information is transmitted only when the abnormal operation is determined.

According to the control method of the electronic apparatus 100 described above, debugging time and cost may be reduced. The above-described control method of the electronic apparatus may be performed in the electronic apparatus of FIG. 3 or the electronic apparatus of FIG. 7. A program for performing the control method of the electronic apparatus described above may be stored in a recording medium.

Figure 9:
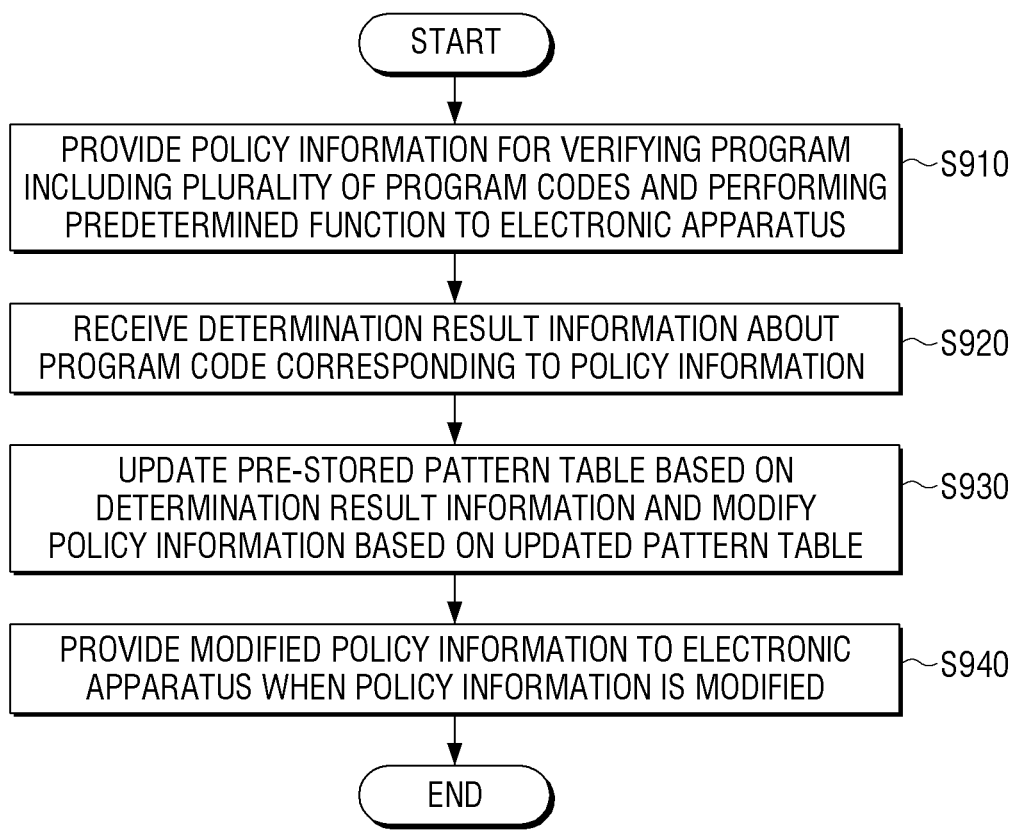
FIG. 9 is a flowchart illustrating a control method of a server according to an exemplary embodiment of the present disclosure.

FIG. 9 is a flowchart illustrating a control method of a server according to an exemplary embodiment of the present disclosure. The flowchart shown in FIG. 9 may be configured with operations that are processed in the server 200 described herein. Therefore, even if omitted below, the contents described with respect to the server 200 may also be applied to the flowchart shown in FIG. 9.

Referring to FIG. 9, the server provides policy information for verification of a program including a plurality of program codes and performing a predetermined function (S910).

The server receives determination result information about whether a program code corresponding to the policy information normally operates from the electronic apparatus (S920).

The server updates a pre-stored pattern table based on the determination result information received from the electronic apparatus, and modifies the policy information based on the updated pattern table (S930).

For example, when a pattern corresponding to the determination result information received from the electronic apparatus does not belong to the pre-stored pattern table, the server may provide information about the pattern to a user, and when receiving weight information about the pattern in response to the provision of the information about the pattern, update the pre-stored pattern table using the input weight information and the pattern.

In this case, the server may generate a list of normal patterns based on the frequency of each of a plurality of patterns constituting the updated pattern table and the weight information, and modify the policy information to include the generated list of normal patterns.

When the policy information is modified, the server provides the modified policy information to the electronic apparatus (S940).

The server may receive apparatus information from each of a plurality of electronic apparatuses, classify the plurality of electronic apparatuses into a plurality of types based on the received apparatus information, and provide the same policy information to the plurality of electronic apparatuses of the same type. The apparatus information may include at least one of country information, software model information, and connection device information.

The server includes a memory storing a table having the plurality of types and information of electronic apparatuses corresponding to the plurality of types, respectively. Upon receiving the apparatus information from the electronic apparatus, the server may determine a type corresponding to the received apparatus information and selectively add information of the electronic apparatus to the table based on the number of samples in the determined type and the table stored in the memory.

According to the control method of the server according to the above-described embodiment, since the number of samples is specified for each type and debugging information is collected only from a predetermined number of apparatuses, the memory may be managed more efficiently than debugging information is acquired from all devices. Also, debugging information may be collected and learned from various devices, and policy information may be updated in real time, and thus it is possible to quickly and accurately handle a problem. Further, since a simplified pattern is used compared to existing debugging data when a problem occurs, the debugging time may be greatly shortened.

The control method of the server according to the embodiment described above may be performed in the server of FIG. 2. A recording medium storing a program for performing the control method of the server according to the above-described embodiment may be provided.

Meanwhile, the various embodiments described above may be embodied in a recording medium which may be read by a computer or a similar apparatus using software, hardware, or a combination thereof. According to a hardware implementation, the embodiments described in the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electrical unit for performing other functions. According to a software implementation, embodiments such as the procedures and functions described herein may be implemented in separate software modules. Each of the software modules may perform one or more of the functions and operations described herein.

Computer instructions for performing the processing operations in the electronic apparatus 100 according to various embodiments of the present disclosure described above may be stored in a non-transitory computer-readable medium. The computer instructions stored in the non-transitory computer-readable medium cause a specific device to perform the processing operations in the electronic apparatus 100 according to the various embodiments described above when executed by a processor of the specific device.

For example, a non-transitory computer-readable medium storing a program performing a control method of an electronic apparatus may be provided, wherein the control methods includes a step of receiving policy information including target information and determination information from an external server and a step of performing a predetermined function using the program including a plurality of program codes and performing the predetermined function, when a program code corresponding to the target information is executed while performing the predetermined function, comparing an execution result of the program code with the determination information and determining whether the program code normally operates.

Computer instructions for performing the processing operations in the server according to various embodiments of the present disclosure described above may be stored in a non-transitory computer-readable medium. The computer instructions stored in the non-volatile computer-readable medium cause a specific device to perform the processing operations in the server according to the various embodiments described above when executed by a processor of the specific device.

For example, a non-transitory computer-readable medium storing a program performing a control method of a server may be provided, wherein the control methods includes a step of providing policy information for verification of a program constituted by a plurality of program codes and performing a predetermined function to an electronic apparatus, a step of receiving determination result information about whether a program code corresponding to the policy information normally operates from the electronic apparatus, a step of updating a pre-stored pattern table based on the determination result information received from the electronic apparatus and modifying the policy information based on the updated pattern table, and a step of, when the policy information is modified, providing the updated policy information to the electronic apparatus.

The non-transitory computer-readable medium is not a medium that stores data for a short period of time, such as a register, cache, memory, etc., but is a medium that semi-permanently stores data and is readable by a device. Specific examples of the non-transitory computer-readable medium include CD, DVD, hard disk, Blu-ray disk, USB, memory card, ROM, and the like.

According to an embodiment, the methods according to the various embodiments disclosed in the present document may be included and provided in a computer program product. The computer program product may be traded as a product between a seller and a purchaser. The computer program product may be distributed in a form of a storage medium (for example, a compact disc read only memory (CD-ROM)) that may be read by a device or online through an application store (for example, Play Store™). In the case of the online distribution, at least portions of the computer program product may be at least temporarily stored in a storage medium such as a memory of a server of a manufacturer, a server of an application store, or a relay server or be temporarily generated.

Although the exemplary embodiments of the present disclosure have been illustrated and described hereinabove, the present disclosure is not limited to the abovementioned specific exemplary embodiments, but may be variously modified by those skilled in the art to which the present disclosure pertains without departing from the scope and spirit of the present disclosure as disclosed in the accompanying claims. These modifications should also be understood to fall within the scope of the present disclosure.

The invention claimed is:
1. An electronic apparatus comprising:
a memory storing a program including a plurality of program codes and performing a predetermined function;

a communicator configured to receive, from an external server, policy information comprising: target information indicating one of the program codes to be monitored, and determination information including information regarding normal operation of the program code indicated by the target information; and a processor configured to:
  perform the predetermined function using the program, and,
    when the program code indicated by the target information is executed while performing the predetermined function, compare an execution result of the program code with the determination information to determine whether the program code operates normally.

2. The electronic apparatus as claimed in claim 1,
wherein the policy information includes a plurality of target information, and
wherein the processor is configured to determine whether each of the plurality of program codes corresponding to the plurality of target information operates.

3. The electronic apparatus as claimed in claim 2, wherein the processor is configured to compare an execution order of the plurality of program codes corresponding to the plurality of target information with the determination information to determine whether the plurality of program codes operates normally.

4. The electronic apparatus as claimed in claim 1, wherein the determination information includes at least one of information about a normal result of the program code, normal required time information, and normal parameter information of the program code.

5. The electronic apparatus as claimed in claim 1, wherein the processor is configured to control the communicator to transmit determination result information about whether the program code operates normally to the external server.

6. The electronic apparatus as claimed in claim 1, wherein the processor is configured to control the communicator to transmit determination result information about whether the normal operation is determined to the external server only when an abnormal operation is determined on the program code.

7. The electronic apparatus as claimed in claim 1,
wherein the policy information includes information about a result notification method, and
wherein the processor is configured to control the communicator to selectively transmit the determination result information both of when the abnormal operation is determined and when the normal operation is determined or transmit the determination result information only when the abnormal operation is determined, based on the information about the result notification method.

8. A server comprising:
a communicator configured to:
  provide, to an electronic apparatus, policy information for verifying a program including a plurality of program codes and performing a predetermined function, wherein the policy information comprises target information indicating one of the program codes to be monitored and determination information including information regarding normal operation of the program code indicated by the target information, and
  receive, from the electronic apparatus, determination result information about whether the program code indicated by the policy information operates normally; and a processor configured to update a pre-stored pattern table based on the received determination result information and modify the policy information based on the updated pattern table, wherein the pattern table stores information regarding the operation of the program code indicate by the target information,
wherein the processor is configured to control the communicator to provide the modified policy information to the electronic apparatus when the policy information is modified.

9. The server as claimed in claim 8, wherein the processor is configured to, when a pattern corresponding to the received determination result information does not belong to the pre-stored pattern table, provide information about the pattern to a user, and when weight information for the pattern is received in response to the provision of the information about the pattern, update the pre-stored pattern table using the received weight information and the pattern.

10. The server as claimed in claim 9, wherein the processor is configured to generate a list of normal patterns based on a frequency of each of a plurality of patterns constituting the updated pattern table and the weight information, and modify the policy information to include the generated list of normal patterns.

11. The server as claimed in claim 8,
wherein the communicator is configured to receive apparatus information from each of a plurality of electronic apparatuses, and
wherein the processor is configured to classify the plurality of electronic apparatuses into a plurality of types based on the received apparatus information and provide the same policy information to the plurality of electronic apparatuses of the same type.

12. The server as claimed in claim 11, wherein the apparatus information includes at least one of country information, software model information, and connection device information.

13. The server as claimed in claim 11, further comprising:
a memory storing a table having the plurality of types and information of electronic apparatuses corresponding to the plurality of types, respectively; and
an operation input unit configured to receive information about number of samples for each of the plurality of types,
wherein the processor is configured to, when receiving the apparatus information from the electronic apparatus, determine a type corresponding to the received apparatus information, and selectively add information of the electronic apparatus to the table based on the number of samples in the determined type and the table stored in the memory.

14. A control method of an electronic apparatus, the control method comprising:
receiving, from an external server, policy information comprising: target information indicating a program code to be monitored, and determination information including information regarding normal operation of the program code indicated by the target information; and
performing a predetermined function using a program including a plurality of program codes and performing the predetermined function and, when the program code indicated by the target information is executed while performing the predetermined function, comparing an execution result of the program code with the determination information to determine whether the program code operates normally.

15. The control method as claimed in claim 14,
wherein the policy information includes a plurality of target information, and
wherein the determining includes determining whether each of the plurality of program codes corresponding to the plurality of target information operates normally.

* * * * *